United States Patent [19]

Hoskins

[11] 3,930,259

[45] Dec. 30, 1975

[54] SLIDING STYLUS HOLDER FOR AN X-Y PLOTTER
[75] Inventor: David Orville Hoskins, Beaverton, Oreg.
[73] Assignee: Tektronix Inc., Beaverton, Oreg.
[22] Filed: Apr. 22, 1974
[21] Appl. No.: 463,012

[52] U.S. Cl. ............ 346/139 R; 33/1 M; 346/139 B
[51] Int. Cl.² ........................................ G01D 15/24
[58] Field of Search ................ 346/29, 139 B, 139 R; 33/1 M

[56] References Cited
UNITED STATES PATENTS
| 3,019,072 | 1/1962 | Bose et al. | 346/29 |
| 3,333,273 | 7/1967 | Kallen et al. | 346/29 |
| 3,434,218 | 3/1969 | Potter | 33/1 M X |
| 3,673,604 | 6/1972 | Gordon | 346/139 B |

Primary Examiner—Joseph W. Hartary
Attorney, Agent, or Firm—Adrian J. La Rue

[57] ABSTRACT

A sliding stylus holder for an x-y plotter has a three-point roller assembly for engagement with first and second guide rods along which the holder slidably moves. The roller assembly provides minimized frictional engagement with the first guide rod and prevents yawing or rotational movement about the vertical axis of the holder as well as preventing rotation about an axis perpendicular to and extending through the guide rods. Bearing areas are provided by the holder for bearing engagement with a second guide rod which stabilizes the holder and prevents rotation of the holder about the first guide rod. A pressure pad engages the second rod to dampen movement of the holder thereby providing smooth operation of the sliding stylus holder along the guide rods.

9 Claims, 7 Drawing Figures

U.S. Patent   Dec. 30, 1975   Sheet 2 of 3   3,930,259
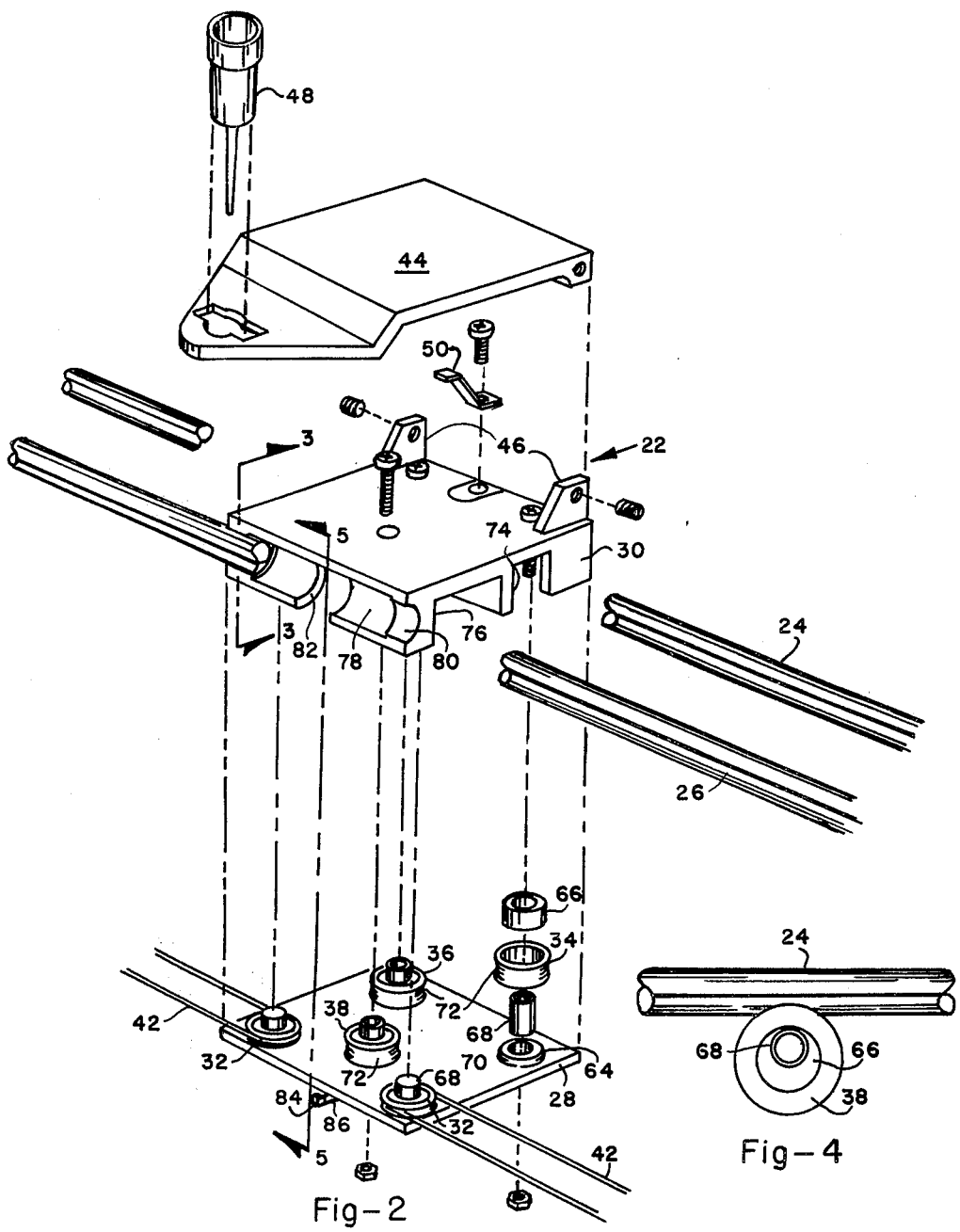
Fig-2
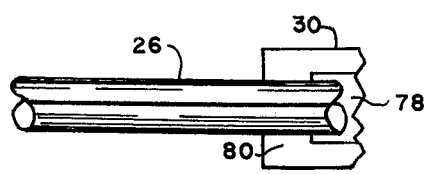
Fig-3
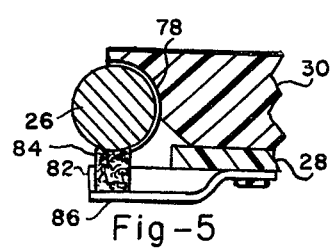
Fig-5
Fig-4

SLIDING STYLUS HOLDER FOR AN X-Y PLOTTER

BACKGROUND OF THE INVENTION

Stylus holders which are used in conjunction with x-y plotters are movable mounted on a movable carrying mechanism so that the stylus holders can be moved therealong as the movable carrying mechanism is also being moved in accordance with operation thereof by drive means operatively connected thereto to record information supplied to the drive means.

It is important that the stylus be moved smoothly without jerky or intermittent movements in order to accurately record the information; otherwise the recorded information will not be accurately presented. It is also important that stylus holders be prevented from rotating or yawing so that they can accurately record information.

SUMMARY OF THE INVENTION

The present invention relates to stylus holders and more particularly to stylus holders for x-y plotters. The stylus is secured in a plate which is pivotally mounted on a housing. The housing includes a plate member having bosses on which rollers and pulleys are positioned and a cover member having bosses in alignment with the bosses on the plate member to maintain the rollers and pulleys in position so that they are freely rotatable. The rollers are disposed so that two outer rollers engage a guide rod along one area thereof and an inner roller is disposed between the two outer rollers and engage the guide rod along an area opposite the area engaged by the two outer rollers which prevents any yawing movement of the stylus holder. Arcuate-engaging sections of the rollers have a configuration so that only the outer parts of the arcuate-engaging sections engage the guide rod to reduce frictional engagement therebetween as well as to provide stability of the stylus holder about its vertical axis and the axis perpendicular to the guide rod and extending therefrom. The inner roller is eccentrically mounted so that the pressure of engagement between the rollers and the guide rod can be adjusted. The cover member is provided with a grooved section having spaced areas engageable with another guide rod to reduce frictional engagement therewith and to prevent any rotational movement of the stylus holder. Pressure means applies pressure onto the other guide rod to take up any manufacturing tolerances and to provide damping of stylus holder movement thereby resulting in smooth operation to eliminate wiggle in recording of information.

It is an object of the present invention to provide a stylus holder having rollers positioned along opposite areas of a guide rod to minimize frictional movement therealong and to prevent yawing movement thereof.

Another object of the present invention is the provision of a stylus holder wherein the rollers have arcuate-engaging sections so that only the outer parts of the rollers engage the guide rod to minimize frictional engagement therebetween.

A further object of the present invention is to provide a stylus holder having adjustable roller means for adjusting the pressure of the roller means relative to the guide rod.

An additional object of the present invention is the provision of a stylus holder having spaced areas engageable with another guide rod to reduce frictional engagement therewith and to prevent any rotational movement of the stylus holder.

A still further object of the present invention is to provide a stylus holder having pressure means engageable with the other guide rod to compensate for any manufacturing tolerances and to provide damping of the stylus holder during its movement thereby resulting in smooth operation thereof.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is provided for purposes of illustration and principles thereof and the manner of applying it in practical use so that one may modify it in various forms, each as may be best suited to the conditions of the particular use.

BRIEF DESCRIPTION OF THE DRAWINGS

FIG. 2 is an exploded perspective view of the sliding stylus holder;

FIG. 3 is a cross-sectional view taken along lines 3—3 of FIG. 2;

FIG. 4 illustrates the adjustment means for the inner roller;

FIG. 5 is a cross-sectional view taken along lines 5—5 of FIG. 2;

DETAILED DESCRIPTION OF THE INVENTION

Figure 1:
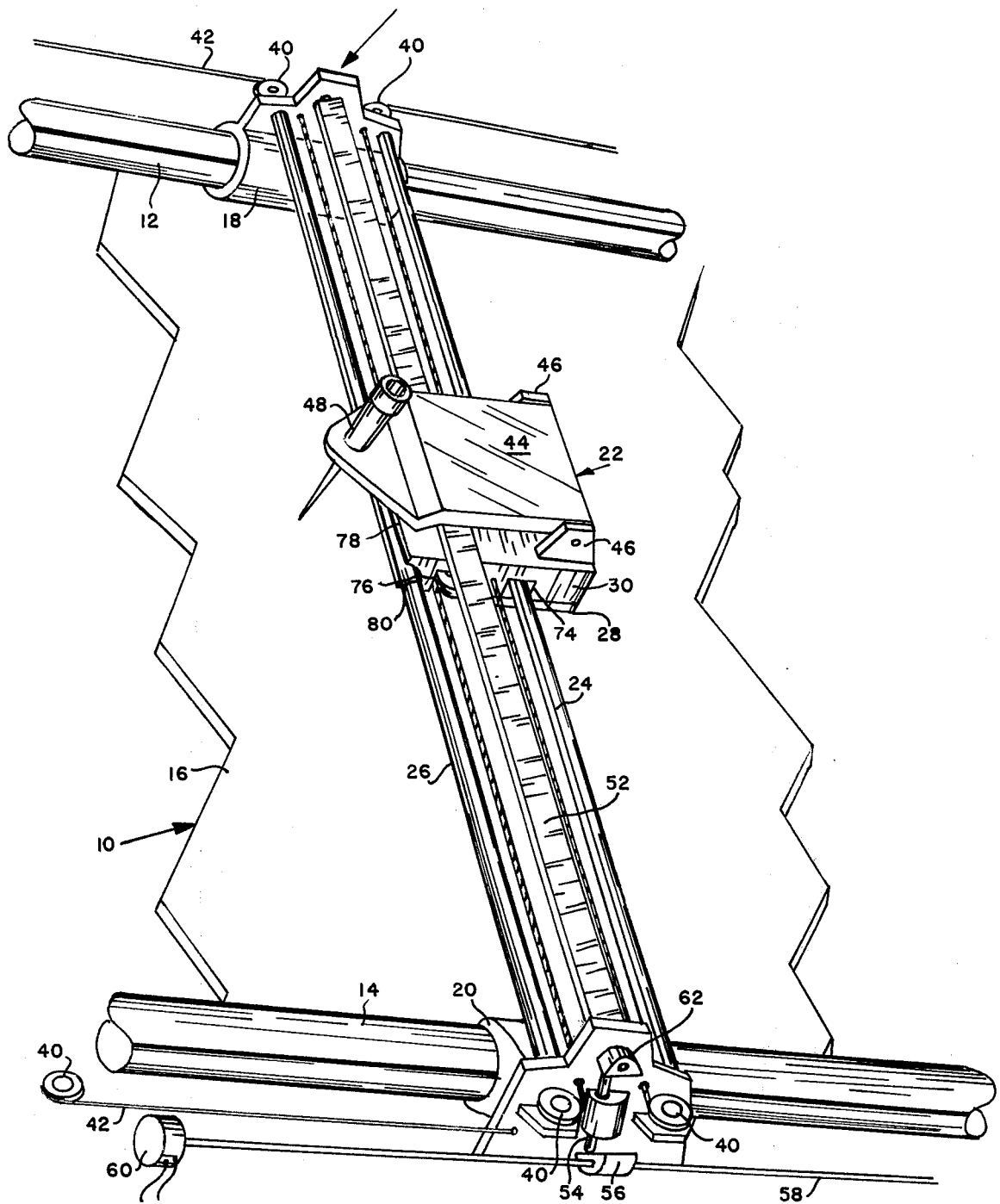
FIG. 1 illustrates a part perspective view of an x-y recorder which includes the sliding stylus holder.

In FIG. 1, an x-y recorder 10 has parallel guide rails 12 and 14 on plotting table 16 onto which recording means, such as paper, is secured. Operating members 18 and 20 are movably mounted on guide rails 12 and 14 and they are reciprocably movable along guide rails 12 and 14 in accordance with conventional operating means such as cables and pulleys (not shown).

A sliding stylus holder 22 is slidably mounted on guide rods 24 and 26 which have their ends secured in operating members 18 and 20 and carried thereby. Stylus holder 22 includes a plate member 28 and a cover member 30 which in assembled condition provide a housing for pulleys 32 and rollers 34, 36 and 38. Operating means including pulleys 40 and cable means 42 operate to slidably move stylus holder 22 along guide rods 24 and 26 in accordance with conventional operating techniques.

A plate 44 is pivotally mounted between projections 46 and carries stylus 48 at a free end thereof so that stylus 48 records information on the recording medium on plotting table 16 as operating members 18 and 20 move along guide rails 12 and 14 and stylus holder 22 slides along guide rods 24 and 26 in accordance with the information being supplied to the operating means therefore. A stop and spring assembly 50 is provided on cover member 30 to limit the upward and downward movement of plate 44. A plate-operating member 52 is pivotally mounted between operating members 18 and 20 and operated by a pin 54 and pin-engaging member 56 secured on shaft 58 which is operated by solenoid 60 to move pin 54 against block 62 secured onto plate-operating member 52 thereby lifting plate 44 up which will interrupt recording by stylus 48. Return of plate-operating member 52 to its inoperative position will enable plate 44 to permit stylus 48 to assume its recording position. The plate-operating mechanism to move the stylus to its inoperative and operative positions is completely described in pending U.S. Pat. application, Ser. No. 466,943, filed May 6, 1974.

Figure 6:
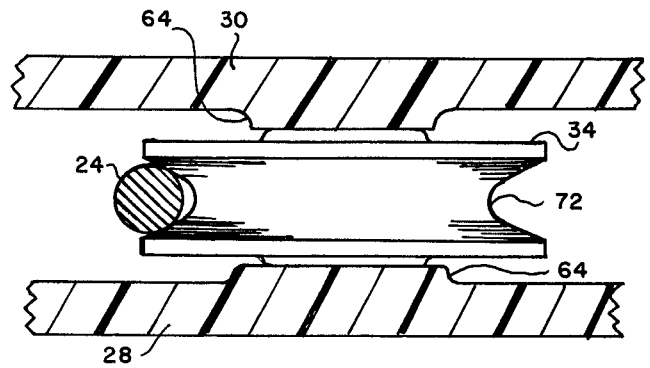
FIG. 6 is an enlarged part cross-sectional view illustrating one of the rollers in engagement with the roller guide rod.

Bosses 64, as shown in FIGS. 2 and 6, are provided on plate member 28 and cover member 30 in opposing relationship. Rollers 34, 36 and 38 and pulleys 32 are made from a suitable plastic, such as Delrin or the like, and they have ball bearings 66 therein to enable them to operate with reduced friction. The ball bearings 66 are mounted on shafts 68 which are disposed in openings 70 in the bosses and the bosses engage the inner races of the ball bearings to secure the rollers and pulleys in position when plate member 28 and cover member 30 are secured together by bolts that extend through the shafts of rollers 34, 36 and 38. The shafts for pulleys 32 are disposed in blind holes (not shown) in their bosses.

Figure 7:
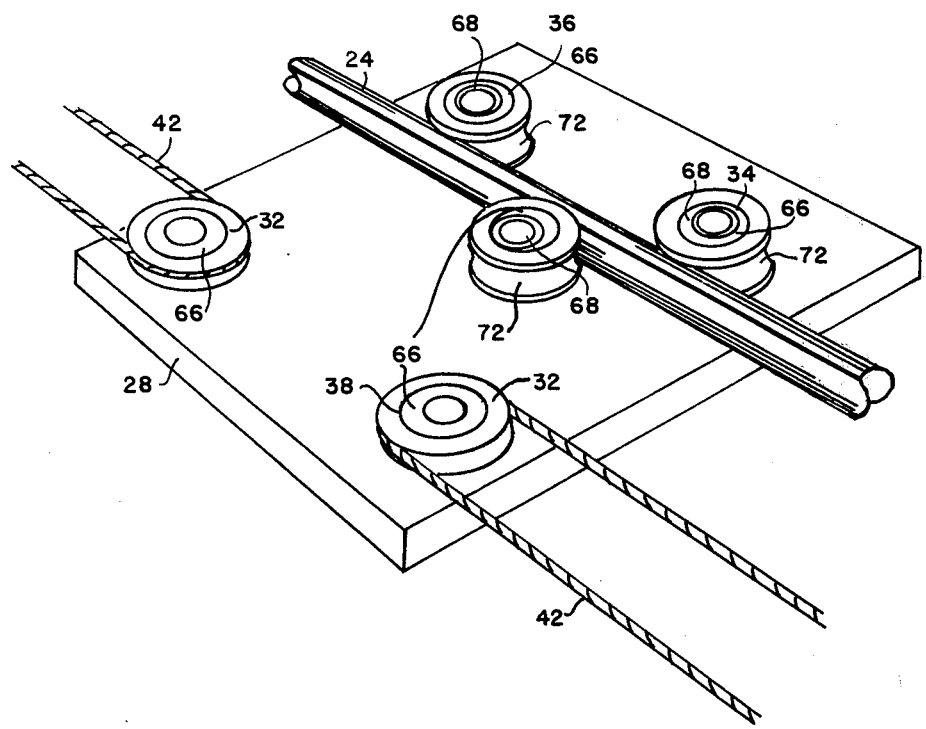
FIG. 7 is a perspective view of the plate member with the cover member removed.

The shaft for inner roller 38 is eccentric as best shown in FIG. 4 so that it can be rotated thereby enabling inner roller 38 to be adjustable relative to outer rollers 34 and 36 so as to adjust the pressure of the rollers on guide rod 24. Rollers 34, 36 and 38 have an arcuate area 72 which has a radius so that the outer sections or rims of the rollers engage guide rod 24, as shown in FIG. 6, at minimal areas of contact which substantially reduces frictional engagement therebetween as the rollers roll along guide rod 24 as well as preventing rotation about the vertical axis and an axis perpendicular to the guide rods and extending therethough. Cover member 30 has openings 74 and 76 so that guide rod 24 extends through openings 74 whereas cable 42 is disposed along respective pulleys 32 as shown in FIGS. 2 and 7 for translational movement thereby of stylus holder 22. The engagement of rollers 34, 36 and 38 with guide rod 24 prevents guide rod 24 from engagement with plate member 28 and cover member 30. The triangular disposition of rollers 34, 36 and 38 provides uniform distribution of pressure on guide rod 24 via the adjustment of inner roller 38 and prevents yawing movement of the stylus holder during its sliding movement.

A groove 78 is provided in cover member 30 along which guide rod 26 extends and it has bearing surfaces 80 at each end thereof that bear on or engage guide rod 26 so that only these surfaces engage guide rod 26 and not all of groove 78 to minimize frictional engagement therebetween. The movement of stylus holder 22 along guide rod 26 prevents rotational movement thereof about guide rod 24 and also contributes to nonyawing movement.

An opening 82 is located in groove 78 into which a pressure pad 84 extends which is held against guide rod 26 via spring 86 secured on plate member 28. Pressure pad 84 applies pressure onto guide rod 26 to take up all clearances between guide rod 26 and bearing surfaces 80 and also provides damping of stylus holder movement thereby resulting in smooth stylus operation which eliminates wiggle in the recorded information.

The plate member 28, cover member 30 and plate 44 can be molded from a suitable plastic material but they can also be formed from metal if desired.

As can be discerned, there has been disclosed a novel and unique stylus holder for use on x-y recorders or in conjunction with other recording means. It will therefore be appreciated that the aforementioned and other objects have been achieved; however, it should be emphasized that the particular embodiment of the invention, which is shown and described herein, is intended as merely illustrative and not as restrictive of the invention.

The invention is claimed in accordance with the following:

1. A stylus holder for sliding movement along guide rods of a recorder apparatus for recording information on a recording medium thereon, said stylus holder comprising:
   a mounting member;
   roller members mounted on mounting means arranged in parallel provided by said mounting member with said roller members being arranged in a triangular configuration for rolling engagement with one of the guide rods, each of said roller members having an arcuate area that provide minimal contact areas with the one of the guide rods thereby minimizing frictional engagement therebetween;
   groove means provided by said mounting member for engagement with another of the guide rods, said groove means having bearing means that engage the another of the guide rods thereby minimizing frictional engagement therebetween;
   means provided by said mounting member for engagement by operating means to slidably move the stylus holder along the guide rods; and
   plate means pivotally mounted on said mounting member for carrying a stylus member for recording information on the recording medium.

2. A stylus holder according to claim 1 wherein one of said roller members between the other two roller members is mounted on eccentric mounting means to enable the one roller member to be adjusted relative to the other two roller members to adjust the pressure of engagement of the roller members on the one guide rod.

3. A stylus holder according to claim 1 wherein said groove means comprises a slot, spring-biased pressure pad means mounted on said mounting member disposed in said slot for engagement with the other of the guide rods.

4. A stylus holder according to claim 1 wherein said mounting member comprises a plate member and a housing member, bosses provided by said plate member and said housing member, said roller members having bearing means provided with inner races, said bosses engaging said inner races to permit free movement of said roller members.

5. In a graphic recorder for recording information:
   a plotting area onto which recording means is positioned;
   rail means disposed along said plotting area including operating members for movement therealong;
   parallel guide rods mounted between said operating members and for movement therewith;
   stylus holder means slidably mounted on said guide rods including roller members and groove means, said roller members disposed parallel with respect to said plotting area and being in engagement with one of said guide rods, each of said roller members having an arcuate area that provide minimal contact areas with the one of said guide rods thereby minimizing frictional engagement therebetween, said groove means having disposed therein another of said guide rods and including bearing means that engage said another of said guide rods thereby minimizing frictional engagement therebetween, and plate means carrying a stylus for recording engagement with the recording means; and operating means operatively connected to said operating members and said stylus holder means for moving said operating members along said rail means and said stylus holder means along said guide rods for recording information by said stylus onto the recording means.

6. In a graphic recorder according to claim 5 wherein said roller members include aligned outer roller members and an inner roller member.

7. In a graphic recorder according to claim 6 wherein said inner roller member is mounted on shaft means having an eccentric configuration to enable said inner roller member to be adjusted toward and away from said outer roller members to adjust the pressure of said roller members on said one of said guide rods.

8. In a graphic recorder according to claim 5 wherein said groove means includes a slot, spring-biased pad means mounted on said holder means and disposed in said slot in engagement with the other of said guide means.

9. In a graphic recorder according to claim 5 wherein said plate means is pivotally mounted on said holder means; a stop and spring means is mounted on said holder means to limit upward and downward movement of said plate means and to provide downward pressure on the stylus.

* * * * *